United States Patent
Nemoto et al.

(10) Patent No.: US 8,154,855 B2
(45) Date of Patent: Apr. 10, 2012

(54) SOLID ELECTROLYTIC CAPACITOR AND METHOD FOR MANUFACTURING THE SAME

(75) Inventors: Masaaki Nemoto, Ota (JP); Takashi Umemoto, Hirakata (JP); Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 643 days.

(21) Appl. No.: 12/275,444

(22) Filed: Nov. 21, 2008

(65) Prior Publication Data

US 2009/0135551 A1    May 28, 2009

(30) Foreign Application Priority Data

Nov. 28, 2007  (JP) ................................. 2007-306680

(51) Int. Cl.
*H01G 4/228* (2006.01)
*H01G 9/00* (2006.01)

(52) U.S. Cl. ...................................................... 361/540

(58) Field of Classification Search .................. 361/540, 361/533, 538, 523
See application file for complete search history.

(56) References Cited

U.S. PATENT DOCUMENTS

| | | | | |
|---|---|---|---|---|
| 6,040,229 | A | * | 3/2000 | Kuriyama ..................... 438/396 |
| 6,229,688 | B1 | * | 5/2001 | Kobayashi et al. ........... 361/523 |
| 7,031,141 | B2 | * | 4/2006 | Kuriyama ..................... 361/528 |
| 2007/0159770 | A1 | * | 7/2007 | Kuriyama ..................... 361/528 |

FOREIGN PATENT DOCUMENTS

| | | | |
|---|---|---|---|
| JP | 04-216608 | A | 8/1992 |
| JP | 05109589 | A * | 4/1993 |
| JP | 05234832 | A * | 9/1993 |
| JP | 11016781 | A * | 1/1999 |
| JP | 2000208367 | A * | 7/2000 |
| JP | 2003100556 | A * | 4/2003 |
| JP | 2004-247665 | A | 9/2004 |
| JP | 2006-186083 | A | 7/2006 |

* cited by examiner

*Primary Examiner* — Eric Thomas
*Assistant Examiner* — David M Sinclair
(74) *Attorney, Agent, or Firm* — Marvin A. Motsenbocker; Mots Law, PLLC

(57) ABSTRACT

A method for manufacturing a solid electrolytic capacitor that prevents leakage current from increasing. The method includes preparing a capacitor element including an anode body, which has an anode lead, and a cathode layer; preparing a lead terminal including an anode terminal, a cathode terminal, and a first insulative member which connects the anode terminal and cathode terminal; connecting the lead terminal and the capacitor element by bonding the anode terminal and the anode lead and bonding the cathode terminal and the cathode layer; and molding a package resin around the capacitor element.

4 Claims, 12 Drawing Sheets

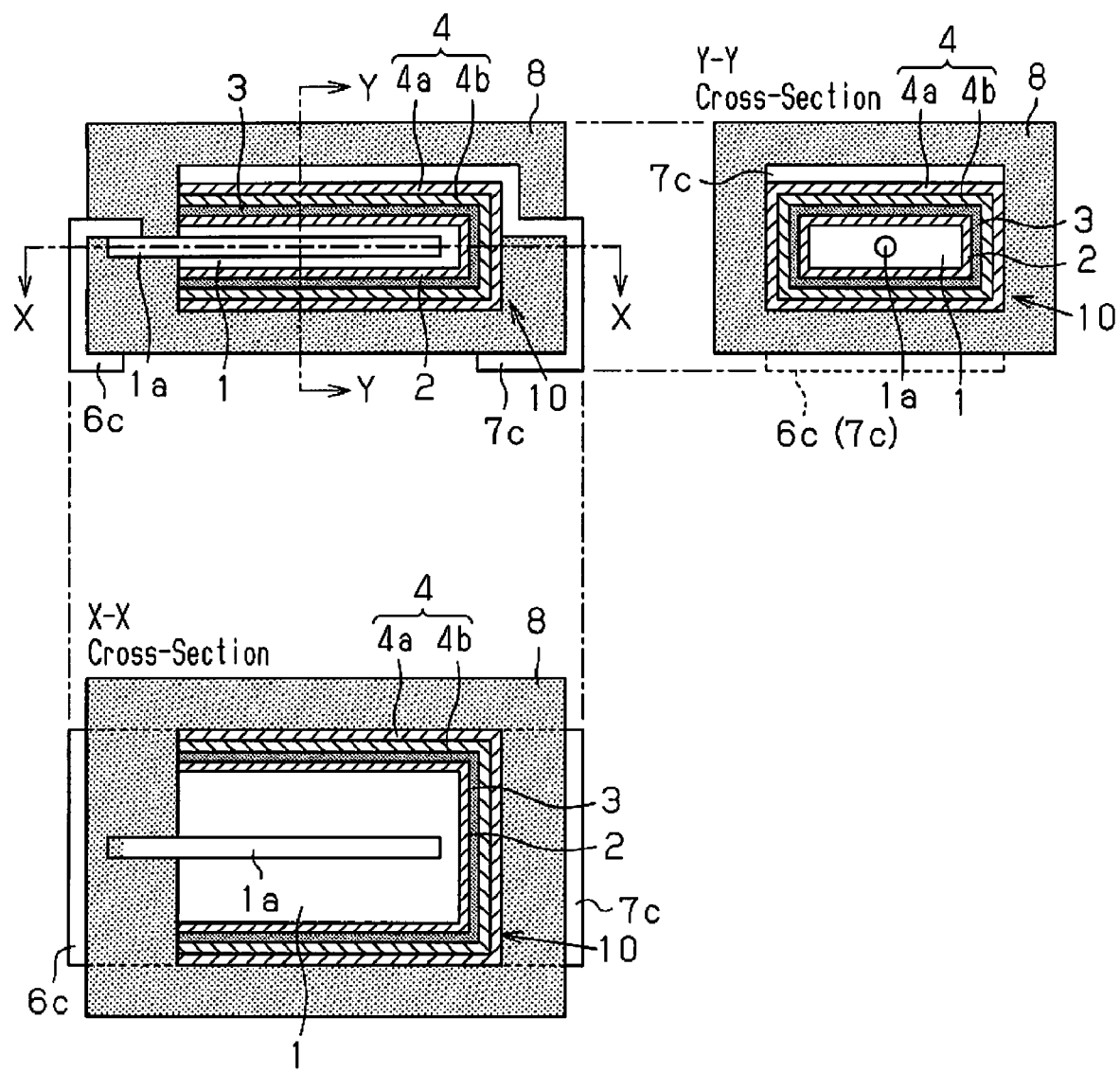

Fig.14

|  |  | Capacitance Changing Rate | ESR Changing Rate | Leakage Current Changing Rate |
|---|---|---|---|---|
| Ex. 1 | Solid Electrolytic Capacitor A1 | 0.96 | 1.2 | 6.1 |
| Ex. 2 | Solid Electrolytic Capacitor A2 | 0.95 | 1.4 | 4.3 |
| Ex. 3 | Solid Electrolytic Capacitor A3 | 0.96 | 1.3 | 1.4 |
| Ex. 4 | Solid Electrolytic Capacitor A4 | 0.97 | 1.1 | 1.0 |
| Ex. 5 | Solid Electrolytic Capacitor A5 | 0.95 | 1.4 | 3.9 |
| Ex. 6 | Solid Electrolytic Capacitor A6 | 0.96 | 1.1 | 3.2 |
| Com. Ex. | Solid Electrolytic Capacitor X | 0.96 | 1.3 | 143.9 |

SOLID ELECTROLYTIC CAPACITOR AND METHOD FOR MANUFACTURING THE SAME

CROSS-REFERENCE TO RELATED APPLICATIONS

This application is based upon and claims the benefit of priority from the prior Japanese Patent Application No. 2007-306680, filed on Nov. 28, 2007, the entire contents of which are incorporated herein by reference.

BACKGROUND OF THE INVENTION

The present invention relates to a solid electrolytic capacitor and a method for manufacturing the same.

A typical solid electrolytic capacitor includes a sintered body formed by press forming and sintering powder of valve metal, such as niobium (Nb) and tantalum (Ta), together with an anode lead. The sintered body is then anodized to form a dielectric layer including mainly oxides on the surface of the sintered body. Subsequently, an electrolyte layer (e.g., manganese dioxide, polypyrrole, polythiophene, etc.) is formed on the dielectric layer. Lastly, a cathode layer (e.g., laminated film of carbon layer and silver paste layer) is formed on the electrolyte layer to obtain a capacitor element. Thereafter, an anode lead and an anode terminal (anode lead frame) are welded and connected together, the cathode layer and a cathode terminal (cathode lead frame) are connected together with a conductive adhesive, and a transfer process is carried out to perform molding and complete the solid electrolytic capacitor. This manufacturing method is described, for example, in Japanese Laid-Open Patent Publication No. 2006-186083.

In such a method of the related art for manufacturing a solid electrolytic capacitor, stress concentrates near the base of the anode lead during molding (i.e., when injecting mold resin into a mold). This may damage the dielectric layer near the base of the anode lead and thereby increase the leakage current of the solid electrolytic capacitor.

SUMMARY OF THE INVENTION

The present invention provides a solid electrolytic capacitor that prevents leakage current from increasing and a method for manufacturing such a solid electrolytic capacitor.

One aspect of the present invention is a method for manufacturing a solid electrolytic capacitor. The method includes preparing a capacitor element including an anode body, which has an anode lead, and a cathode layer; preparing a lead terminal including an anode terminal, a cathode terminal, and a first insulative member which connects the anode terminal and the cathode terminal; connecting the lead terminal and the capacitor element by bonding the anode terminal and the anode lead and bonding the cathode terminal and the cathode layer; and molding a package resin around the capacitor element.

A further aspect of the present invention provides a method for manufacturing a solid electrolytic capacitor. The method includes preparing a capacitor element including an anode body, which has an anode lead, and a cathode layer; connecting a lead terminal to the capacitor element, with the lead terminal including an anode terminal, a cathode terminal, and a first insulative member connecting the anode terminal and the cathode terminal, the anode terminal being bonded to the anode lead, and the cathode terminal being bonded to the cathode layer; and molding a package resin around the capacitor element.

Another aspect of the present invention is a solid electrolytic capacitor provided with a capacitor element including an anode body, which has an anode lead, and a cathode layer. A lead terminal includes an anode terminal, which is connected to the anode lead, and a cathode terminal, which is connected to the cathode layer. A package resin is molded around the capacitor element. The lead terminal further includes a first insulative member connecting the anode terminal and the cathode terminal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic cross-sectional view showing one example of a conventional solid electrolytic capacitor;

FIG. 14 is a table showing evaluation results of the electrostatic capacitance, equivalent series resistance, and leakage current in the solid electrolytic capacitors of examples 1 to 6 and a comparative example.

DETAILED DESCRIPTION OF THE PREFERRED EMBODIMENTS

Various embodiments of the present invention will now be discussed with reference to the drawings. However, the present invention is not limited to the embodiments described below.

[First Embodiment]

Figure 3:
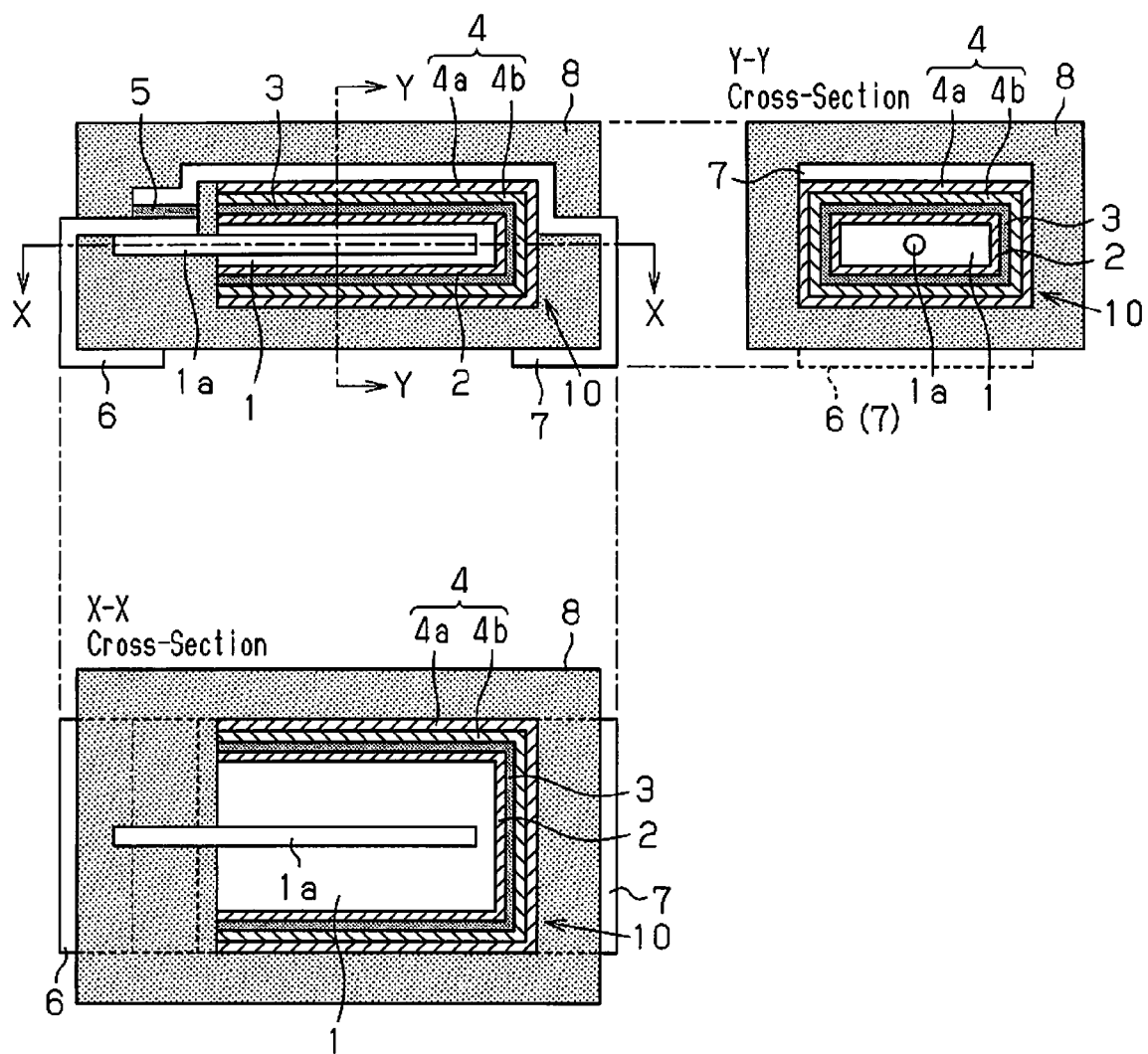
FIG. 3 is a schematic cross-sectional view showing a first embodiment (example 1) of a solid electrolytic capacitor.
Figure 4A:
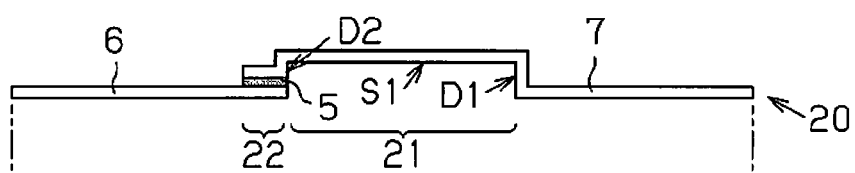
FIGS. 4A and 4B are schematic views of a lead frame used in manufacturing the solid electrolytic capacitor of FIG. 3.
Figure 4B:
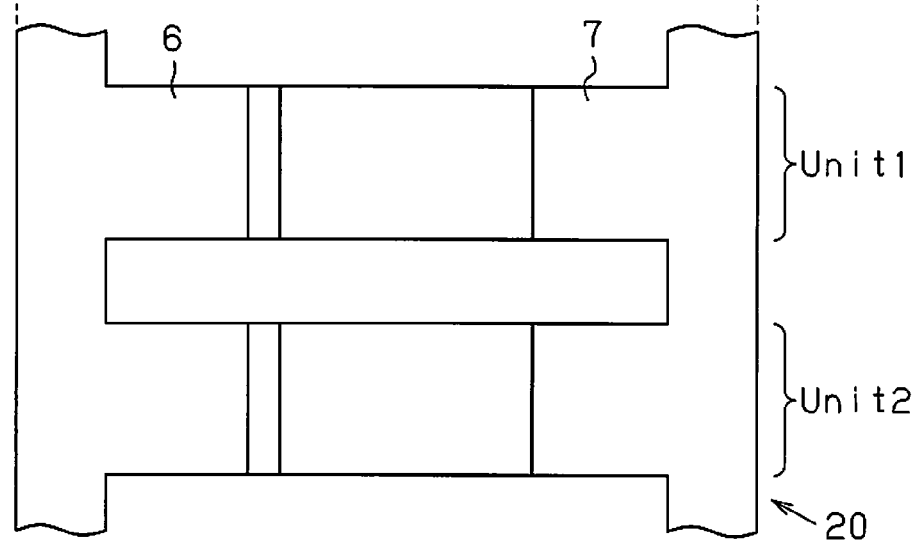

FIG. 3 is a schematic cross-sectional view showing one example of a first embodiment of a solid electrolytic capacitor. FIG. 4 is a schematic view showing a lead frame used to manufacture the solid electrolytic capacitor of FIG. 3. Specifically, FIG. 4A is a schematic cross-sectional view of the lead frame, and FIG. 4B is a schematic plan view of the lead frame. FIG. 5 includes schematic cross-sectional views illustrating a process for manufacturing the solid electrolytic capacitor of FIG. 3.

As shown in FIG. 3, in the first embodiment, the solid electrolytic capacitor includes a capacitor element 10, which has an anode body 1, a dielectric layer 2, a conductive polymer layer 3, and a cathode layer 4. An anode lead 1a extends from the anode body 1. The dielectric layer 2 is formed on along the surface of the anode body 1. The conductive polymer layer 3 is formed on the dielectric layer 2. The cathode layer 4 is formed on the conductive polymer layer 3. In a state in which the anode terminal 6 and the cathode terminal 7, each of which functions as an external lead terminal, are fixed to each other by an insulative adhesive layer 5, a plate-shaped cathode terminal 7 is bonded to the cathode layer 4 of the capacitor element 10 by a conductive adhesive layer (not shown), and a plate-shaped anode terminal 6 is bonded to the anode lead 1a. A mold package 8 of epoxy resin or the like is molded with the anode terminal 6 and the cathode terminal 7 partially extending out of the mold package 8 as shown in FIG. 3.

The structure of the solid electrolytic capacitor will now be described in detail.

The anode body 1 is a porous sintered body of metal particles including a valve metal, and the anode lead 1a is a rod-shaped lead formed from a valve metal. The anode lead 1a is embedded in the anode body 1 in a state partially projecting out of the anode body 1. The valve metal of the anode lead 1a and the anode body 1 is a metal material enabling the formation of an insulative oxide film, such as niobium, tantalum, aluminum (Al), titanium (Ti), or the like. An alloy of these valve metals may also be used.

The dielectric layer 2 is a dielectric formed from oxides of a valve metal and has a predetermined thickness on the surface of the anode body 1. For example, if the valve metal were to include niobium metal, the dielectric layer 2 would be formed from niobium oxide.

The conductive polymer layer 3 functions as an electrolyte layer and is arranged on the surface of the dielectric layer 2. The conductive polymer layer 3 is a laminated film of a first conductive polymer layer formed through chemical polymerization and a second conductive polymer layer formed through electrolytic polymerization. The material of the conductive polymer layer 3 (first conductive polymer layer and second conductive polymer layer) is not particularly limited as long as the material is a conductive polymer material. Examples of such materials having superior conductivity include polypyrrole, polythiophene, polyaniline, polyflan, and a dielectric of these materials.

The cathode layer 4, which is formed by a laminated film of a carbon layer 4a including carbon particles and a silver paste layer 4b including silver particles, is arranged on the conductive polymer layer 3.

The capacitor element 10 is formed by the anode body 1 out of which the anode lead 1a extends, the dielectric layer 2, the conductive polymer layer 3, and the cathode layer 4.

The anode terminal 6 and the cathode terminal 7, which are plate-shaped and preferably formed from a conductive material such as copper (Cu) and nickel (Ni), each function as an external lead terminal of the solid electrolytic capacitor. The anode terminal 6 and the cathode terminal 7 are fixed to each other by the insulative adhesive layer 5. The anode terminal 6 is spot-welded and bonded to the anode lead 1a. The cathode terminal 7 is bonded to the cathode layer 4 by a conductive adhesive layer (not shown). The plate-shaped anode terminal 6 and the cathode terminal 7 have widths that may be widened to substantially the same as that of the anode body 1, as shown in the state of FIG. 3. This reduces resistance loss at the terminals.

The mold package 8 of epoxy resin is molded with the anode terminal 6 and the cathode terminal 7 partially extending out of the mold package 8 in opposite directions. The ends of the anode terminal 6 and the cathode terminal 7 exposed from the mold package 8 are bent along the side surface and the lower surface of the mold package 8 to function as terminals when mounting (soldering) the solid electrolytic capacitor on a substrate.

[Manufacturing Method]

A method for manufacturing the solid electrolytic capacitor of the first embodiment will now be discussed with reference to FIGS. 4 and 5.

First, as shown in FIG. 4, a lead frame 20 in which an anode lead frame with anode terminals 6 and a cathode lead frame with cathode terminals 7 are fixed together by the insulative adhesive layer 5 is prepared. The anode lead frame includes an anode terminal 6 for each unit (unit 1, unit 2, . . . ), and the cathode lead frame also includes a cathode terminal 7 for each unit. A distal end of the anode terminal 6 and a distal end of the cathode terminal 7 are superimposed at a predetermined position (superimposed region 22 at which the terminals are overlapped) for each unit and fixed together by the insulative adhesive layer 5.

Preferably, an insulative adhesive is applied to the anode terminals 6 of the anode lead frame. Then, the cathode terminals 7 of the cathode lead frame is overlapped and bonded to the anode terminals 6 by the insulative adhesive. The insulative adhesive is dried in this state to manufacture the lead frame 20 in which the anode terminals 6 and the cathode terminals 7 are fixed together by the insulative adhesive layer 5. The insulative adhesive layer 5 is formed from an insulative material. For example, a material containing one of epoxy resin, phenol resin, melamine resin, urine resin, alumina, zirconium, and silica may be used.

The lead frame formed in this manner is separately prepared and used in the process for manufacturing the solid electrolytic capacitor of the first embodiment, which will now be described.

Step 1: A green body, which is formed by press forming particles of valve metal so as to embed part of the anode lead 1a, is sintered in a vacuum environment to form the anode body 1, which is a porous sintered body, around the anode lead 1a. The metal particles are fused to one another.

Step 2: The anode body 1 undergoes anodization in a phosphoric acid aqueous solution to form the dielectric layer 2 with the oxide of a valve metal so that the dielectric layer 2 has a predetermined thickness and covers the anode body 1.

Step 3: Chemical polymerization is performed to form the first conductive polymer layer on the surface of the dielectric layer 2 as a pre-coat layer. Specifically, chemical polymerization forms the first conductive polymer layer by oxidatively polymerizing monomer using an oxidant. Thereafter, electrolytic polymerization is performed to form a second conductive polymer layer on the surface of the first conductive polymer layer. Specifically, during electrolytic polymerization, while using the first conductive polymer layer as an anode, the second conductive polymer layer is formed by performing electro-polymerization with an external cathode in an electrolytic solution containing monomer and electrolyte. This forms the conductive polymer layer 3, which is a laminated film including the first conductive polymer layer and the second conductive polymer layer, on the dielectric layer 2.

Step 4: A carbon paste is applied to and dried on the conductive polymer layer 3 to form the carbon layer 4a. A silver paste is applied to and dried on the carbon layer 4a to form the silver paste layer 4b. This forms the cathode layer 4 of a laminated film including the carbon layer 4a and the silver paste layer 4b on the conductive polymer layer 3.

Steps 1 to 4 are performed as described above to manufacture the capacitor element 10.

Figure 5A:
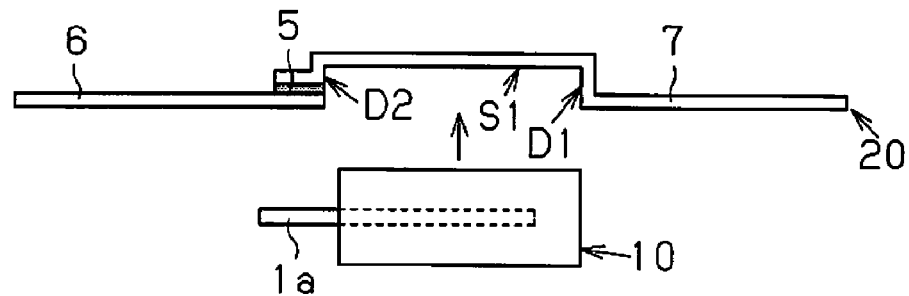
FIGS. 5A to 5D are schematic cross-sectional views illustrating a process for manufacturing the solid electrolytic capacitor of FIG. 3.
Figure 5B:
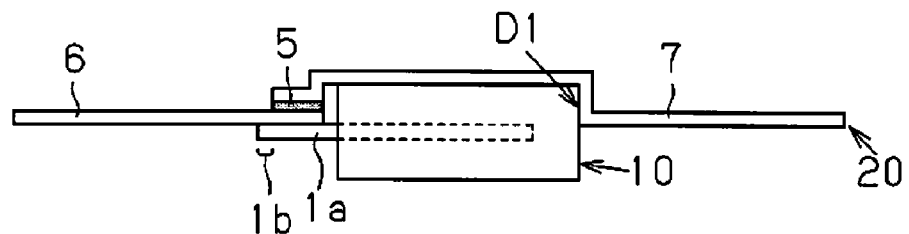

Step 5: The lead frame 20 (lead frame in which the anode terminal 6 and the cathode terminal 7 are fixed together by the insulative adhesive layer 5) manufactured as described above is prepared. As shown in FIG. 5A, the capacitor element 10 is arranged at a position corresponding to the lead frame 20 in a state slightly spaced apart from the lead frame 20. After applying the conductive adhesive to the cathode terminal 7 of the lead frame 20, the cathode layer 4 (see FIG. 3) and the cathode terminal 7 are brought into contact by way of the conductive adhesive. The conductive adhesive is then dried in this state to connect the cathode layer 4 (see FIG. 3) and the cathode terminal 7 with the conductive adhesive (not shown), as shown in FIG. 5B. The anode terminal 6 is spot-welded and connected to the anode lead 1a.

Figure 5C:
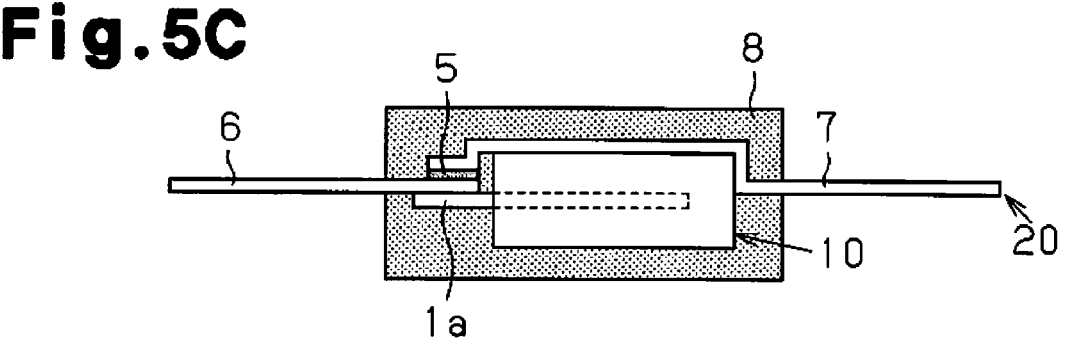

Step 6: A transfer process is performed to mold the mold package 8 around the capacitor element 10, as shown in FIG. 5C. In this case, the anode lead 1a, the anode body 1, the dielectric layer 2, the conductive polymer layer 3, and the cathode layer 4 are accommodated in the mold package 8, and the ends of the anode terminal 6 and the cathode terminal 7 extend out of the mold package 8 in opposite directions. The resin for molding the mold package 8 is preferably a resin (e.g., epoxy resin) having a small water absorption coefficient to prevent moisture from entering and exiting the mold package and to prevent cracking and chipping during reflow (heat treatment).

Step 7: The anode terminal 6 and the cathode terminal 7 are cut away from the lead frame 20, and the anode terminal 6 and the cathode terminal 7 are processed to have predetermined lengths.

Figure 5D:
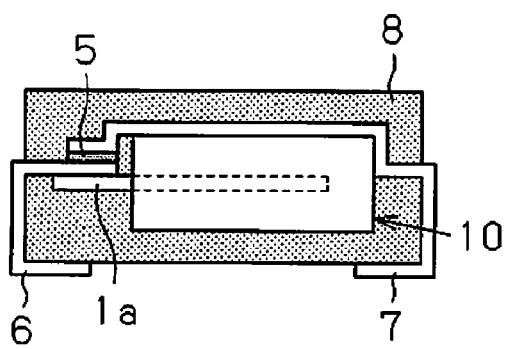

Step 8: As shown in FIG. 5D, the distal ends of the anode terminal 6 and the cathode terminal 7 exposed from the mold package 8 are bent downward and extended along the side surface and lower surface of the mold package 8. The distal ends of the terminals function as terminals of the solid electrolytic capacitor for electrically connecting the solid electrolytic capacitor to a substrate.

Step 9: Finally, an aging process of applying a predetermined voltage through the two terminals of the solid electrolytic capacitor is performed. This stabilizes the characteristics of the solid electrolytic capacitor.

Through the above steps, the solid electrolytic capacitor of the first embodiment is manufactured.

Example 1 (solid electrolytic capacitor A1) and example 2 (solid electrolytic capacitor A2), which were fabricated to conduct a characteristic evaluation on the solid electrolytic capacitor of the first embodiment, will now be described.

Example 1

In example 1, the solid electrolytic capacitor A1 was fabricated through steps 1A to 9A, which respectively correspond to steps 1 to 9 in the manufacturing method of the above-described embodiment. FIGS. 3 to 5 are used to illustrate the structure and manufacturing method of the solid electrolytic capacitor A1 of example 1.

Step 1A: Niobium metal powder having a CV value of 150,000 µF·V/g was prepared. The CV value is the product of the capacitance of the niobium porous sintered body after the formation of the dielectric layer and the formation voltage. The green body was molded from the niobium metal powder to embed part of the anode lead 1a and then sintered in a vacuum environment at a temperature of approximately 1,200° C. This formed an anode body 1 of niobium porous sintered body out of which the anode lead 1a partially extends. The niobium metal particles were fused to one another. Unless otherwise mentioned, the CV value in each of the following examples and comparative examples is 150,000 µF·V/g.

Step 2A: Anodization was performed on the sintered anode body 1 for ten hours with a constant voltage of about 10 V in a phosphoric acid aqueous solution of about 0.1% by weight held at a temperature maintained at about 60° C. This formed the dielectric layer 2 from niobium oxide so as to cover the anode body 1.

Step 3A: The anode body 1, the surface on which the dielectric layer 2 was formed, was immersed in an oxidant solution and then immersed in a pyrrole monomer solution to polymerize the pyrrole monomer on the dielectric layer 2. This formed the first conductive polymer of polypyrrole on the dielectric layer 2 as the pre-coat layer. Subsequently, while using the first conductive polymer layer as an anode, the second conductive polymer layer was further formed with a predetermined thickness on the first conductive polymer layer by performing electrolytic polymerization in the electrolytic solution containing the pyrrole monomer and the electrolyte. This formed the second conductive polymer layer of polypyrrole on the first conductive polymer layer. In this manner, the conductive polymer layer 3 including a laminated film of the first conductive polymer layer and the second conductive polymer layer was formed on the surface of the dielectric layer 2.

Step 4A: Carbon paste was applied to and dried on the conductive polymer layer 3 to form the carbon layer 4a, which is a layer of carbon particles, and silver paste was applied to and dried on the carbon layer 4a to form the silver paste layer 4b, which is a layer of silver particles. This formed the cathode layer 4 of a laminated film including the carbon layer 4a and the silver paste layer 4b on the conductive polymer layer 3.

Through steps 1A to 4A, the capacitor element 10 was fabricated.

Step 5A: The lead frame 20 (lead frame in which the anode terminal 6 and the cathode terminal 7 are fixed by the insulative adhesive layer 5) shown in FIG. 4 was prepared. Preferably, the lead frame 20 is formed in the following manner. An insulative adhesive of liquid epoxy resin is applied to the anode terminal 6 of the anode lead frame to bond the cathode terminal 7 of the cathode lead frame to the anode terminal 6 with the insulative adhesive. In this state, the insulative adhesive was dried for 30 minutes at a temperature of 100° C. The anode terminal 6 and the cathode terminal 7 were adhered together by the insulative adhesive layer 5.

In example 1, the anode terminal 6 of the anode lead frame was a plate-shaped terminal, as shown in FIG. 4A. The cathode terminal 7 of the cathode lead frame was processed to have a predetermined shape at the superimposed region 22, in which the cathode terminal 7 is overlapped with the anode terminal 6, and an element mounting region 21, in which the cathode terminal 7 is mounted on and bonded to the cathode layer 4 of the capacitor element 10 (see FIG. 3). The element mounting region 21 is defined by portions bent from a main surface S1 on which the capacitor element 10 (bent portion D1 on cathode side and bent portion D2 on anode side). The anode terminal 6 and the cathode terminal 7 were fixed together by the insulative adhesive layer 5 at the superimposed region 22 that is where the anode lead 1a is to be positioned.

As shown in FIG. 5A, the capacitor element 10 was arranged at a position corresponding to the lead frame 20 in a state slightly spaced apart from the lead frame 20. The conductive adhesive of silver paste was applied to the cathode terminal 7 of the lead frame 20, and the cathode layer 4 (see FIG. 3) of the capacitor element 10 was brought into contact with the main surface S1 of the cathode terminal 7 along the bent portion D1 of the cathode terminal 7. The conductive adhesive was dried in this state to connect the cathode layer 4 (see FIG. 3) and the cathode terminal 7 together with the conductive adhesive layer (not shown), as shown in the state of FIG. 5B.

Further, the anode terminal 6 was spot-welded and connected to the anode lead 1a. Specifically, referring to FIG. 5B, current was applied to two welding electrodes holding in between the anode lead 1a and the anode terminal 6 at the distal end 1b of the anode lead 1a, which extends to a position exceeding the edge of the superimposed region 22 (position at which the anode terminal 6 is not covered by the cathode terminal 7) to fuse and bond the anode lead 1a and the anode terminal 6 with the resistance heat.

Step 6A: The transfer process was carried out to perform molding. Specifically, the capacitor element 10 was arranged in a mold (between upper and lower molds), and epoxy resin was pressurized and charged into the mold in a heated and softened state. After completely filling the gap between the capacitor element 10 and the mold with epoxy resin, the epoxy resin was cured while keeping the temperature high for a certain time. This formed the generally box-shaped mold package 8 of epoxy resin around the capacitor element 10, as shown in FIG. 5C. In this state, the anode lead 1a, the anode body 1, the dielectric layer 2, the conductive polymer layer 3, and the cathode layer 4 are accommodated in the mold package 8, and the ends of the anode terminal 6 and the cathode terminal 7 are extended out of the mold package 8 in opposite directions. The epoxy resin for the mold package 8 may be a resin composition of biphenyl epoxy resin and a flame retardant (brominated epoxy resin/antimonous oxide), imidazole curing agent, 1% by weight of flexibilizing agent (silicone), and 82% by weight of filler agent (fused silica). Such an epoxy resin was adjusted such that the minimum viscosity in a softened state was 60 Pa·s or less. The molding conditions were, for example, the mold temperature being 175° C., the holding time (pre-heating time) of the epoxy resin before injection being 10 seconds, the holding time (curing time) after injection being 90 seconds, and the injection pressure of the epoxy resin being 7 MPa.

Step 7A: The anode terminal 6 and the cathode terminal 7 were each adjusted to the predetermined lengths and cut away from the lead frame 20 (anode lead frame and cathode lead frame).

Step 8A: As shown in FIG. 5D, the distal ends of the anode terminal 6 and the cathode terminal 7 exposed from the mold package 8 were bent downward and extended along the side surface and the lower surface of the mold package 8.

Step 9A: Finally, for the aging process, a voltage of 4 V was applied to the two terminals (anode terminal 6, cathode terminal 7) of the solid electrolytic capacitor, and this state was held for two hours.

The solid electrolytic capacitor A1 of example 1 was fabricated in this manner.

The anode lead 1a serves as the "anode lead" of the present invention. The anode body 1 serves as the "anode" of the present invention. The dielectric layer 2 serves as the "dielectric layer" of the present invention. The conductive polymer layer 3 serves as the "electrolyte layer" of the present invention. The cathode layer 4 serves as the "cathode layer" of the present invention. The capacitor element 10 serves as the "capacitor element" of the present invention. The insulative adhesive layer 5 serves as the "first insulative member". The anode terminal 6 serves as the "anode terminal" of the present invention. The cathode terminal 7 serves as the "cathode terminal" of the present invention. The external lead terminal or the lead frame 20 serves as the "lead terminal" of the present invention. The mold package 8 serves as the "package resin" of the present invention. The main surface Si serves as the "main surface" of the present invention. The bent portion D1 serves as the "bent portion" of the present invention. The superimposed region 22 serves as the "superimposed region" of the present invention.

Example 2

In example 2, the shapes of the anode terminal 6 and the cathode terminal 7 of the lead frame 20 prepared in step 5A are changed. Specifically, the position of the superimposed region 22 at which the terminals 6 and 7 are fixed together with the insulative adhesive layer 5 is changed from the position on the anode lead 1a to the position on the cathode layer 4. Otherwise, the solid electrolytic capacitor A2 was fabricated in the same manner as in example 1.

Figure 6:
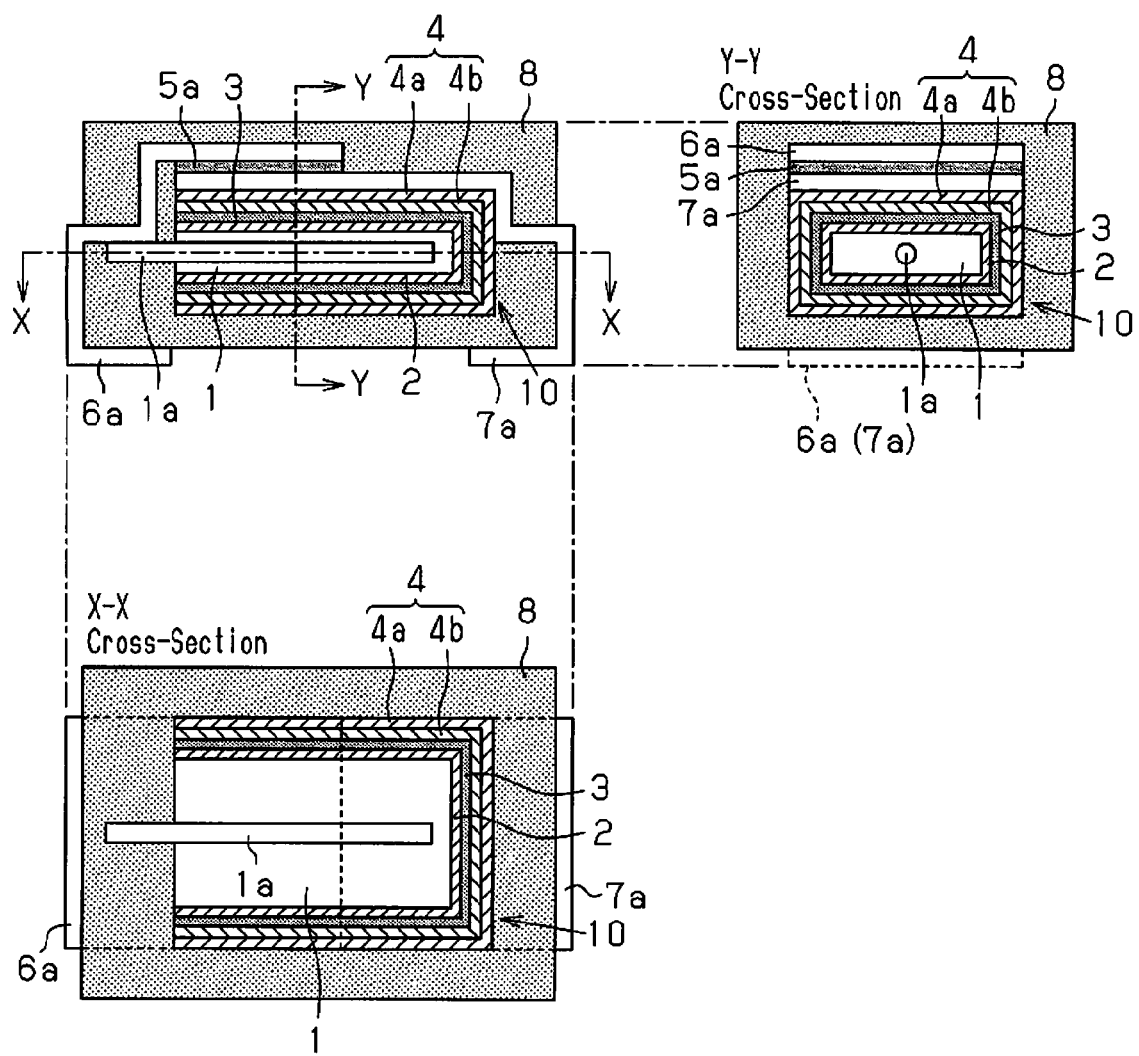
FIG. 6 is a schematic cross-sectional view showing the first embodiment (example 2) of a solid electrolytic capacitor.

FIG. 6 is a schematic cross-sectional view showing the solid electrolytic capacitor of example 2, and FIG. 7 includes schematic cross-sectional views illustrating a process for manufacturing the solid electrolytic capacitor of example 2.

Steps 1B to 4B: The capacitor element 10 was prepared by performing steps 1B to 4B, which respectively correspond to steps 1A to 4A of example 1.

Figure 7A:
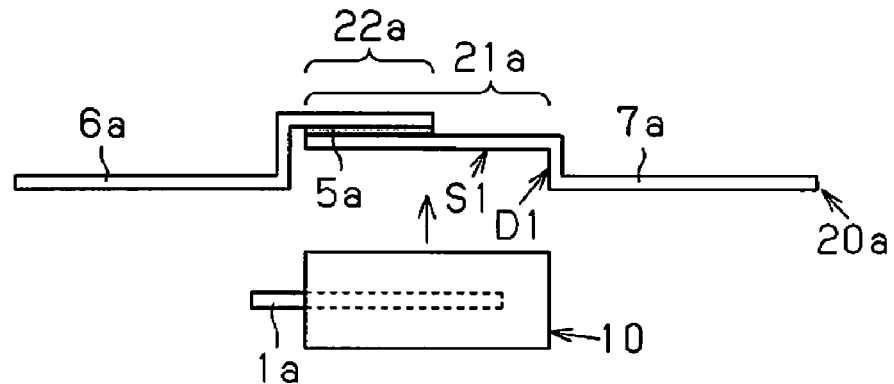
FIGS. 7A to 7D are schematic cross-sectional views illustrating a process for manufacturing the solid electrolytic capacitor of FIG. 6.

Step 5B: The lead frame (lead frame in which an anode terminal 6a and a cathode terminal 7a are fixed by way of an insulative adhesive layer 5a) 20a shown in FIG. 7A was prepared. In example 2, as shown in FIG. 7A, the anode terminal 6a of the anode lead frame and the cathode terminal 7a of the cathode lead frame were bent to have predetermined shapes such that the superimposed region 22a was positioned on the cathode layer 4 of the capacitor element 10 (see FIG. 6). The anode terminal 6a and the cathode terminal 7a were fixed together by the insulative adhesive layer 5a in the superimposed region 22a.

Figure 7B:
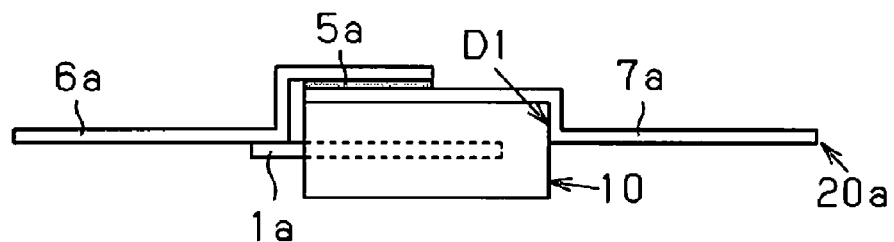

As shown in FIG. 7A, the capacitor element 10 was arranged at a position corresponding to the lead frame 20a slightly spaced apart from the lead frame 20a. As shown in FIG. 7B, the cathode layer 4 (see FIG. 6) and the cathode terminal 7a were connected by the conductive adhesive layer (not shown), and the anode terminal 6a was spot-welded and connected to the anode lead 1a.

Figure 7C:
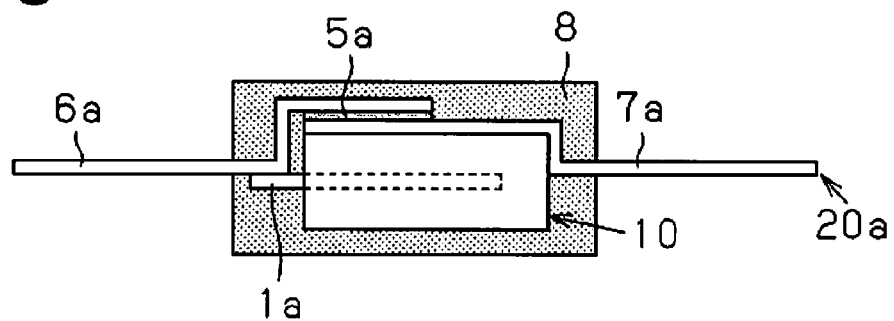
Figure 7D:
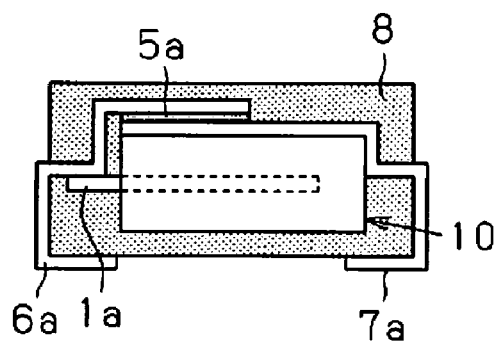

Step 6B: The transfer process was carried out to mold the generally box-shaped mold package 8 around the capacitor, as shown in FIG. 7C. In this case, the anode lead 1a, the anode body 1, the dielectric layer 2, the conductive polymer layer 3, and the cathode layer 4 are accommodated in the mold package 8, and the ends of the anode terminal 6a and the cathode terminal 7a are extended out of the mold package 8 in opposite directions.

Steps 7B to 9B: The solid electrolytic capacitor shown in FIGS. 7D and 6 was completed by performing steps 8B to 9B, which respectively correspond to steps 7A to 9A of example 1.

The solid electrolytic capacitor A2 of example 2 was fabricated in this manner.

The insulative adhesive layer 5a serves as the "first insulative member" of the present invention. The anode terminal 6a serves as the "anode terminal" of the present invention. The cathode terminal 7a serves as the "cathode terminal" of the present invention. The external lead terminal or the lead frame 20 serves as the "lead terminal" of the present invention. The superimposed region 22a serves as the "superimposed region" of the present invention.

[Second Embodiment]

Figure 8:
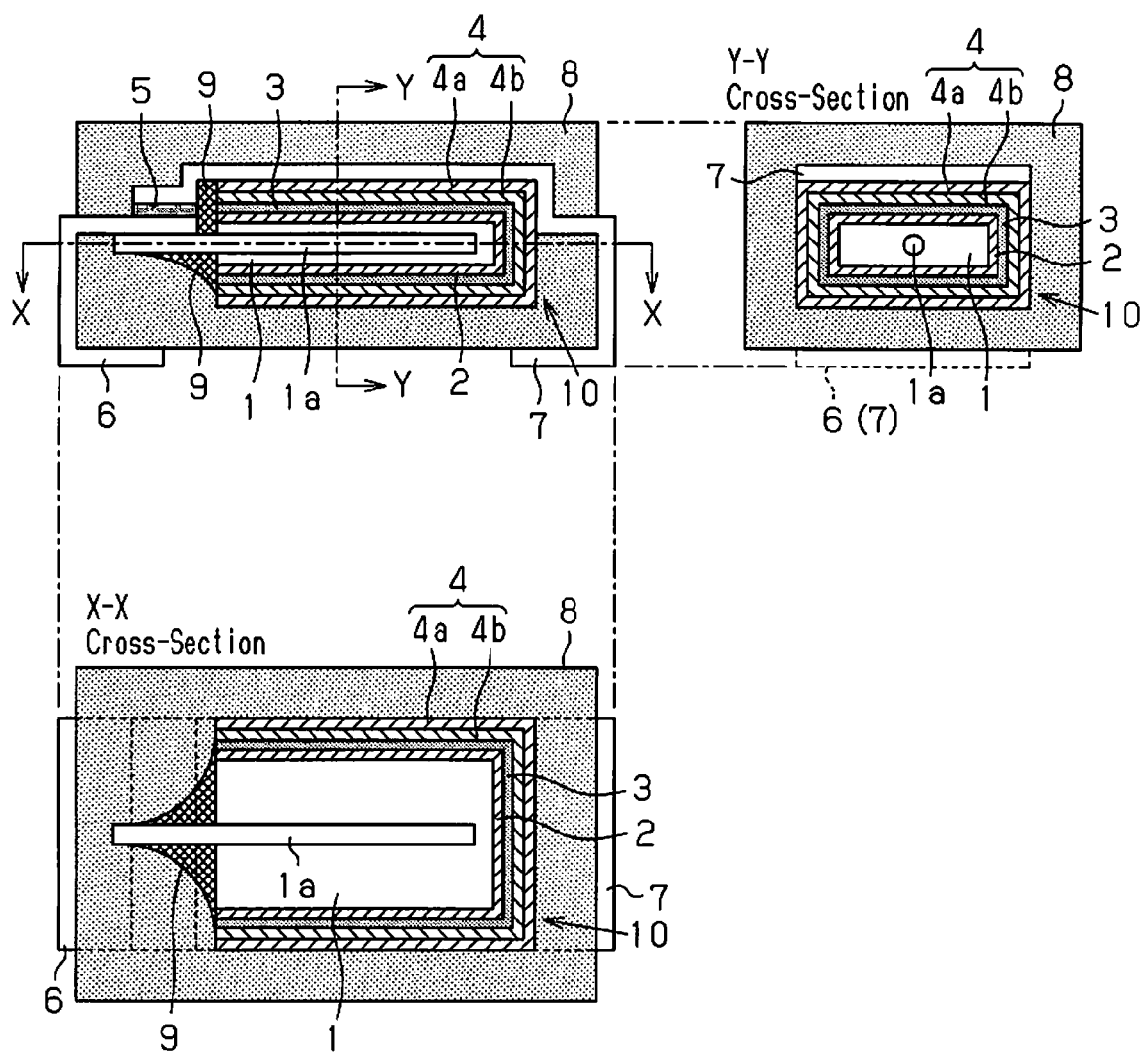
FIG. 8 is a schematic cross-sectional view showing a second embodiment (example 3) of a solid electrolytic capacitor.
Figure 9:
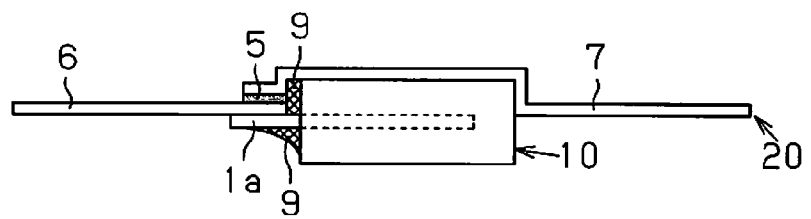
FIG. 9 is a schematic cross-sectional view illustrating an additional step in the process for manufacturing the solid electrolytic capacitor of FIG. 8.

FIG. 8 is a schematic cross-sectional view showing one example of a second embodiment of a solid electrolytic capacitor, and FIG. 9 is a schematic cross-sectional view illustrating an additional step in process for manufacturing the solid electrolytic capacitor of FIG. 8. The difference from the first embodiment is in that the external lead terminal (anode terminal 6 and cathode terminal 7) and the capacitor element 10 are further fixed by an insulative adhesive layer 9, as shown in FIG. 8. Otherwise, the second embodiment is the same as the first embodiment. The insulative adhesive layer 9 serves as the "second insulative member" of the present invention.

The solid electrolytic capacitor of the second embodiment differs from the solid electrolytic capacitor (see FIG. 3) of the first embodiment in that the insulative adhesive layer 9 fills the gap between the external lead terminal and the capacitor element 10 and covers the anode lead 1a, which is welded to the anode terminal 6. This reinforces the anode lead 1a. The mold package 8 is arranged so as to accommodate of these parts.

[Manufacturing Method]

When manufacturing the solid electrolytic capacitor of the second embodiment, step A of forming the insulative adhesive layer 9 is added, as shown in FIG. 9, between step and step 6 of the first embodiment. The insulative adhesive layer 9 is formed by applying and drying an insulative adhesive so as to at least partially fill the gap between the external lead terminal (lead frame 20) and the capacitor element 10 and to at least partially cover the anode lead 1a on the anode terminal 6. The insulative adhesive layer 9 may be made from the same material as the insulative adhesive layer 5 or may be made from a different material.

Example 3 (solid electrolytic capacitor A3) and example 4 (solid electrolytic capacitor A4), which were fabricated to carry out a characteristic evaluation on the solid electrolytic capacitor of the second embodiment, will now be described.

Example 3

In example 3, the solid electrolytic capacitor A3 was fabricated in the same manner as in example 1 except in that step A was added between step 5A and step 6A of example 1. FIGS. 5, 8, and 9 are used to illustrate the structure and manufacturing method of the solid electrolytic capacitor A3 of example 3.

Steps 1C to 5C: The capacitor element 10 was prepared by performing steps 1C to 4C, which respectively correspond to steps 1A to 4A of example 1. Further, in step 5C, which corresponds to step 5A of example 1, the capacitor element 10 was mounted and bonded to the lead frame 20 (lead frame in which the anode terminal 6 and the cathode terminal 7 are fixed together by the insulative adhesive layer 5).

Step A: An insulative adhesive of a liquid epoxy resin was applied so as to fill the gap between the lead frame 20 and the capacitor element 10 and cover the anode lead 1a on the anode terminal 6. The insulative adhesive was dried for 30 minutes at a temperature of 100° C. to form the insulative adhesive layer 9, as shown in FIG. 9. Here, the insulative adhesive layer 9 and the insulative adhesive layer 5 were formed using the same insulative adhesive of liquid epoxy resin.

Steps 6C to 9C: The solid electrolytic capacitor shown in FIG. 8 was completed by performing steps 6C to 9C, which respectively correspond to steps 6A to 9A of example 1.

The solid electrolytic capacitor A3 of example 3 was fabricated in this manner.

The insulative adhesive layer 9 serves as the "second insulative member" of the present invention.

Example 4

In example 4, the solid electrolytic capacitor A4 was fabricated in the same manner as in example 2 except in that step A was added between step 5B and step 6B of example 2.

Figure 10:
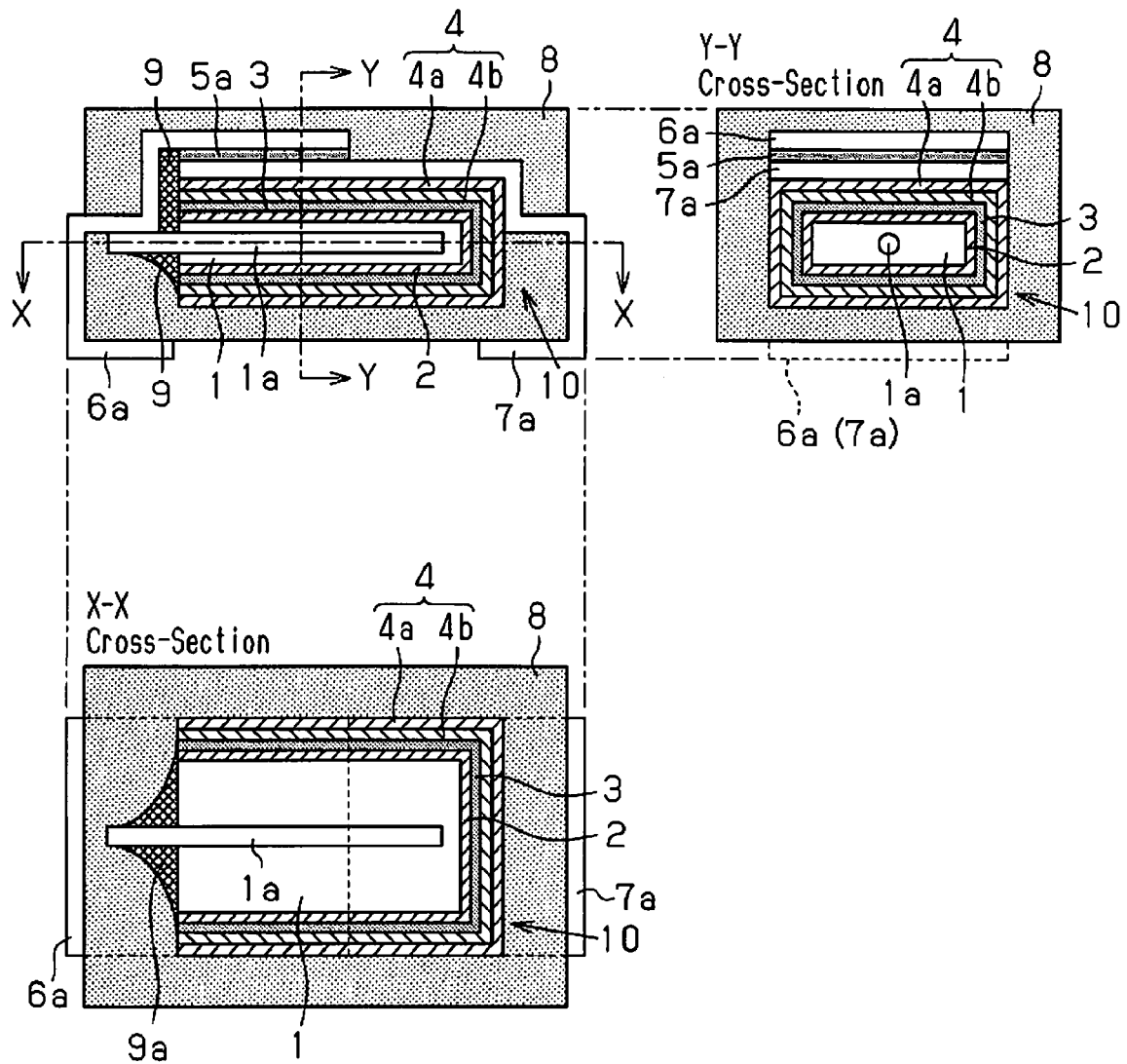
FIG. 10 is a schematic cross-sectional view showing the second embodiment (example 4) of a solid electrolytic capacitor.
Figure 11:
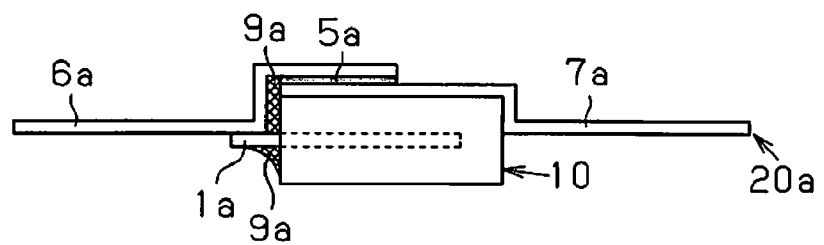
FIG. 11 is a schematic cross-sectional view illustrating an additional step in the process for manufacturing the solid electrolytic capacitor of FIG. 10.

FIG. 10 is a schematic cross-sectional view showing the solid electrolytic capacitor of example 4, and FIG. 11 is a schematic cross-sectional view illustrating the additional step in the process for manufacturing the solid electrolytic capacitor of FIG. 10. FIG. 7 shows a process for manufacturing the solid electrolytic capacitor A4 of example 4.

Steps 1D to 5D: The capacitor element 10 was prepared through steps 1D to 4D, which respectively correspond to steps 1B to 4B of example 2. Further, step 5D corresponding to step 5B of example 2 was performed to mount and bond the capacitor element 10 to the lead frame 20a (lead frame in which the anode terminal 6a and the cathode terminal 7a are fixed together by the insulative adhesive layer 5a).

Step A: An insulative adhesive of liquid epoxy resin was applied so as to fill the gap between the lead frame 20a and the capacitor element 10 and cover the anode lead 1a on the anode terminal 6a. The insulative adhesive was dried for 30 minutes at a temperature of 100° C. to form an insulative adhesive layer 9a, as shown in FIG. 11. Here, the insulative adhesive layer 9a and the insulative adhesive layer 5a were formed using the same insulative adhesive of liquid epoxy resin.

Steps 6D to 9D: Steps 6D to 9D respectively corresponding to steps 6B to 9B of example 2 were performed to complete the solid electrolytic capacitor shown in FIG. 10.

The solid electrolytic capacitor A4 of example 4 was fabricated in this manner.

The insulative adhesive layer 9a serves as the "second insulative member" of the present invention.

[Third Embodiment]

Figure 12:
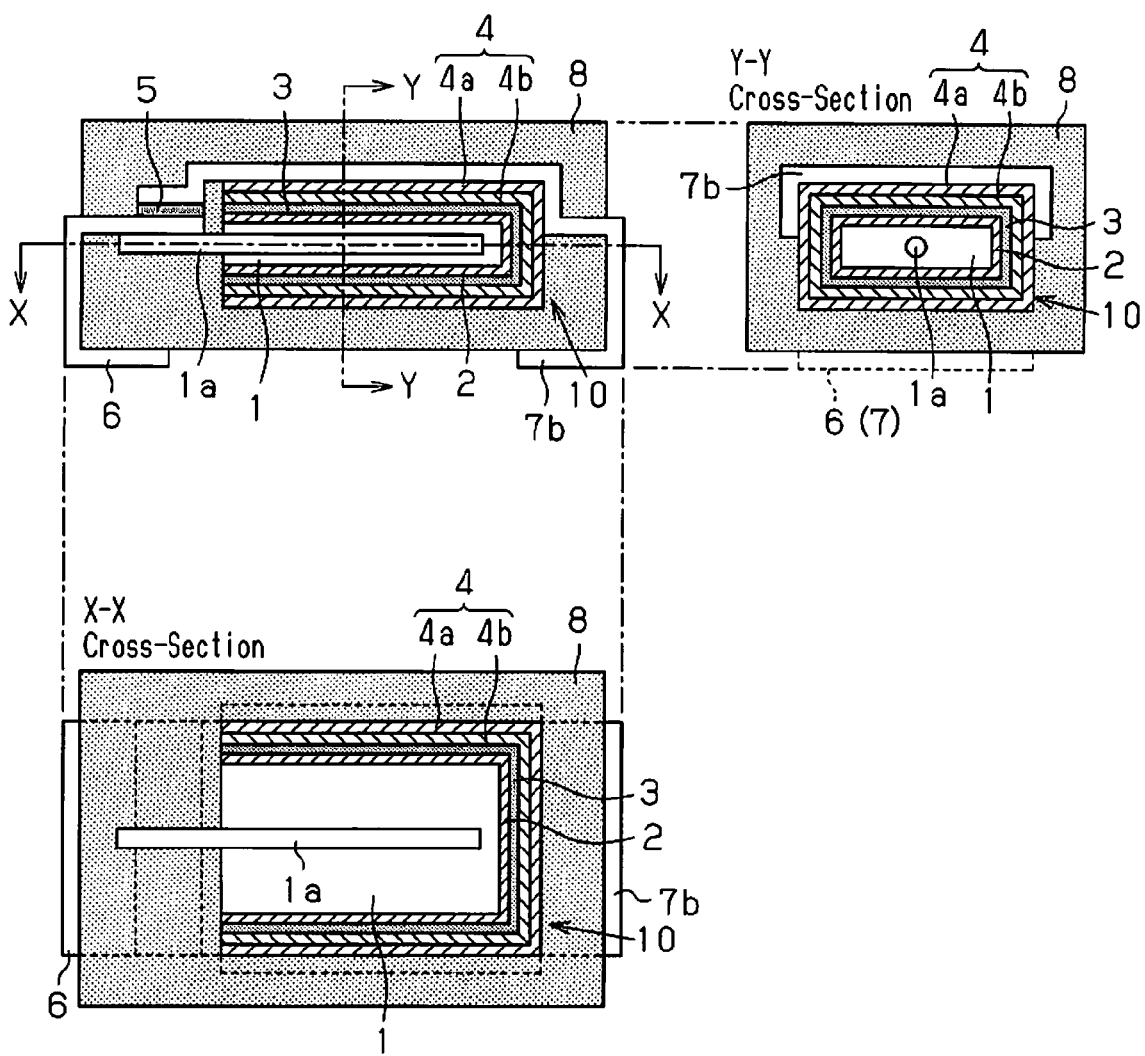
FIG. 12 is a schematic cross-sectional view showing a third embodiment (example 5) of a solid electrolytic capacitor.

FIG. 12 is a schematic cross-sectional view showing one example of a third embodiment of a solid electrolytic capacitor. The third embodiment differs from the first embodiment in that the cathode terminal 7b is bent so as to hold the left and right sides of the capacitor element 10, as shown in FIG. 12 (right drawing). Otherwise, the third embodiment is the same as the first embodiment.

The solid electrolytic capacitor of the third embodiment differs from the solid electrolytic capacitor (see FIG. 3) of the first embodiment in that the cathode terminal 7b extends along the left and the right side surfaces of the cathode layer 4 of the capacitor element 10. This further firmly bonds the capacitor element 10 to the cathode terminal 7b. Such solid electrolytic capacitor is easily manufactured through a manufacturing method similar to that of the first embodiment by preparing the lead frame including the cathode terminal 7b that is bent into a predetermined shape.

Example 5 (solid electrolytic capacitor A5) and example 6 (solid electrolytic capacitor A6), which were fabricated to carry out a characteristic evaluation on the solid electrolytic capacitor of the third embodiment, will now be described.

Example 5

In example 5, the solid electrolytic capacitor A5 was fabricated in the same manner as in example 1 except in that a lead frame including the cathode terminal 7b bent into a predetermined shape as shown in FIG. 12 was prepared in step 5A of example 1.

The solid electrolytic capacitor A5 of example 5 has a structure similar to example 1 but differs from example 1 in that the cathode terminal 7b is bent so as to hold the left and right sides of the capacitor element 10. Such a solid electrolytic capacitor is fabricated through a manufacturing method similar to that of example 1 except in that a lead frame including the cathode terminal 7b is bent into a predetermined shape.

The cathode terminal 7b serves as the "cathode terminal" of the present invention.

Example 6

Figure 13:
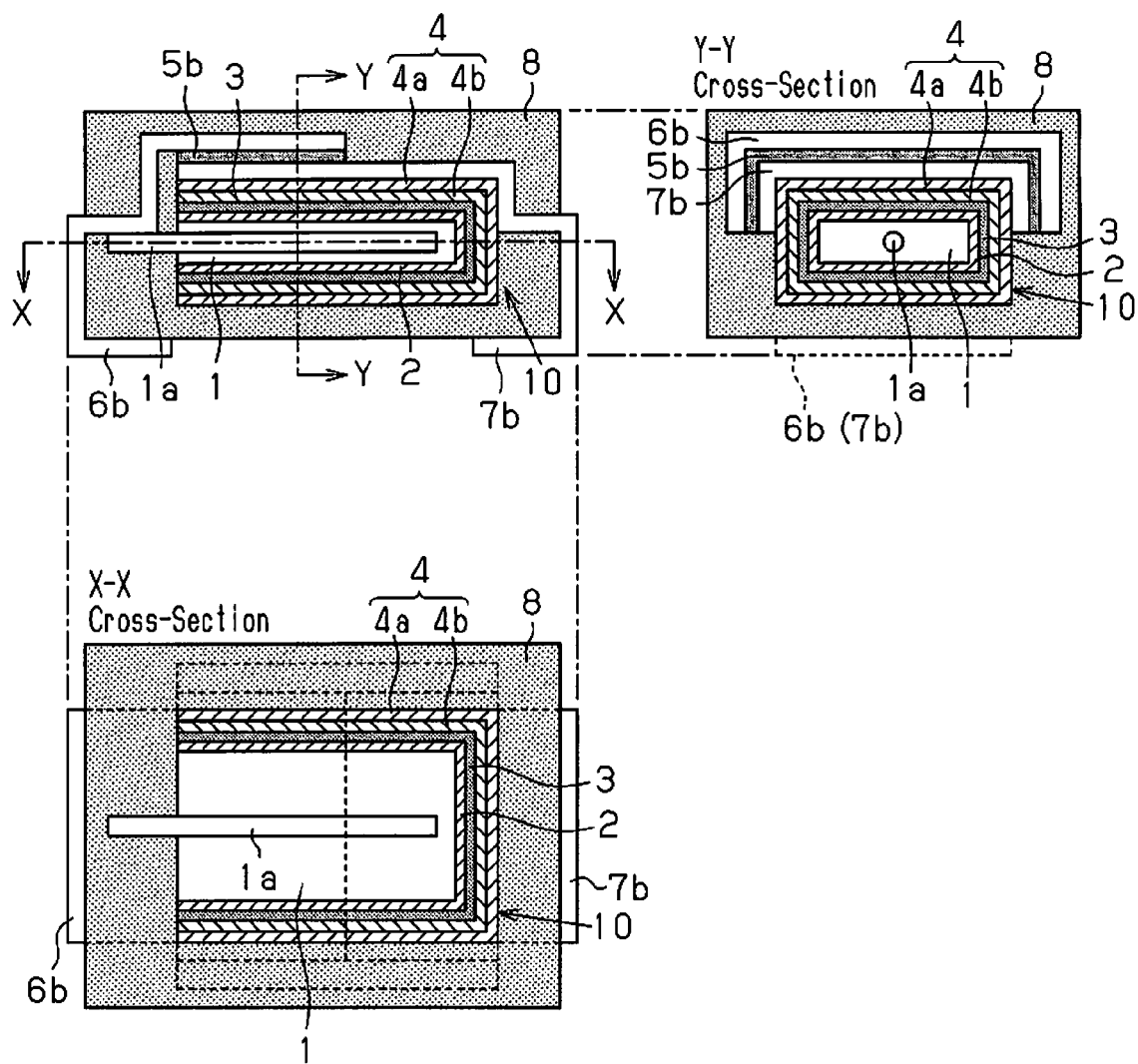
FIG. 13 is a schematic cross-sectional view showing the third embodiment (example 6) of a solid electrolytic capacitor.

In example 6, the solid electrolytic capacitor A6 was fabricated in a manner similar to example 2 except in that in step 5A of example 1, a lead frame including the cathode terminal 7b bent into a predetermined shape and the anode terminal 6b bent into a predetermined shape so as to cover the cathode terminal 7b as shown in FIG. 13 was prepared.

The solid electrolytic capacitor A6 of example 6 is similar to example 2 but differs from example 2 in that the cathode terminal 7b, the insulative adhesive layer 5b, and the anode terminal 6b are bent so as to hold the left and right sides of the capacitor element 10. Such a solid electrolytic capacitor is manufactured through a manufacturing method similar to that of example 2 by using the lead frame including the cathode terminal 7b bent to a predetermined shape and the anode terminal 6b bent to a predetermined shape so as to cover the cathode terminal 7b.

The insulative adhesive layer 5b serves as the "first insulative member" of the present invention, and the anode terminal 6b serves as the "anode terminal" of the present invention.

Comparative Example

In the comparative example, a solid electrolytic capacitor X was fabricated in a manner similar to example 1 except in that a conventional lead frame 20c (lead frame in which the anode terminal and the cathode terminal are not bonded together by the insulative adhesive layer) was used.

FIG. 1 is a schematic cross-sectional view showing a conventional solid electrolytic capacitor (comparative example), and FIG. 2 includes schematic cross-sectional views illustrating a process for manufacturing the solid electrolytic capacitor of FIG. 1.

The solid electrolytic capacitor of the comparative example includes the capacitor element 10 of one of the above-described examples, in which the anode terminal 6c is spot-welded and bonded to the anode lead 1a of the capacitor element 10. The cathode terminal 7c is bonded to the cathode layer 4 by a conductive adhesive layer (not shown). The mold package 8 accommodates all of these parts.

[Manufacturing Method]

Steps 1E to 4E: The capacitor element 10 was prepared through steps 1E to 4E, which respectively correspond to steps 1A to 4A of example 1.

Step 5E: A lead frame 20c (lead frame in which a distal end of the anode terminal 6c and a distal end of the cathode terminal 7c are not bonded) shown in FIG. 2A was prepared. In the comparative example, the anode terminal 6c having the same shape as the anode terminal 6 of example 1 was used, and the cathode terminal 7c having the same shape as the cathode terminal 7a of example 2 was used.

Figure 2A:
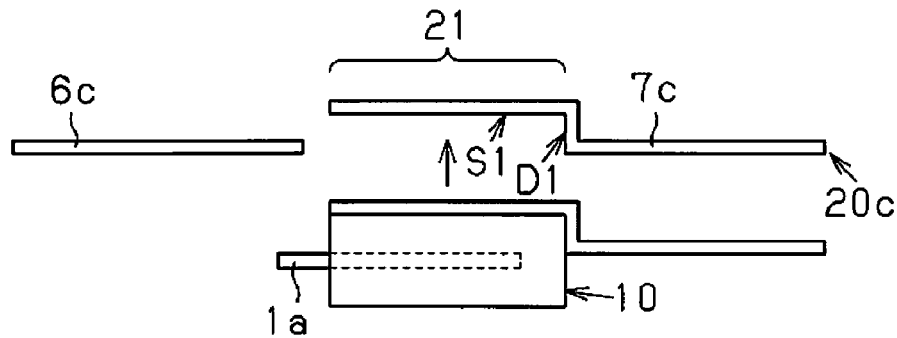
FIGS. 2A to 2D are schematic cross-sectional views illustrating a process for manufacturing the solid electrolytic capacitor of FIG. 1.
Figure 2B:
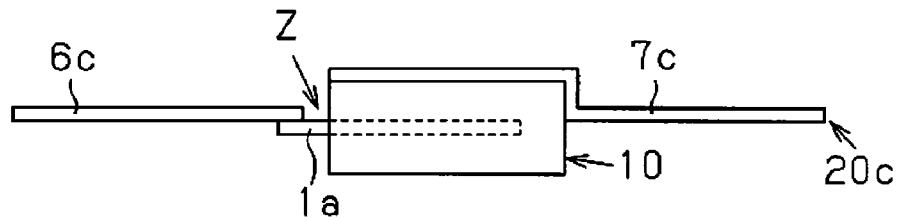

As shown in FIG. 2A, the capacitor element 10 was arranged at a position corresponding to the lead frame 20c. As shown in FIG. 2B, the cathode layer 4 (see FIG. 1) and the cathode terminal 7c were connected by a conductive adhesive layer (not shown), and the anode terminal 6c was spot-welded and connected to the anode lead 1a.

Figure 2C:
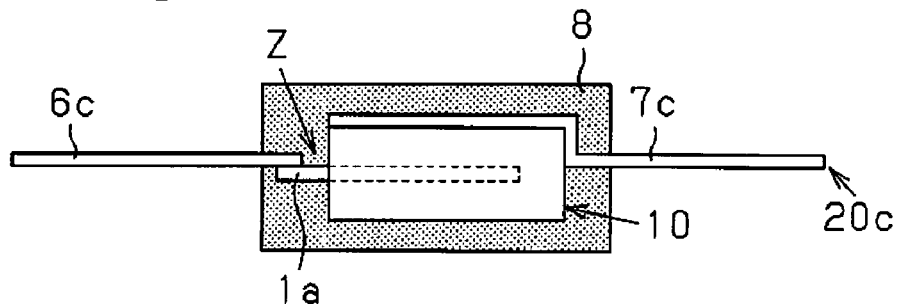
Figure 2D:
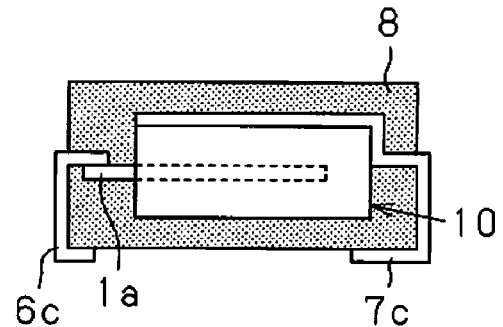

Step 6E: The transfer process was performed to mold the generally box-shaped mold package 8 around the capacitor element 10, as shown in FIG. 2C. In this case, the anode lead 1a, the anode body 1, the dielectric layer 2, the conductive polymer layer 3, and the cathode layer 4 were accommodated in the mold package 8, and the ends of the anode terminal 6c and the cathode terminal 7c were extended out of the mold package 8 in opposite directions.

Steps 7E to 9E: Steps 7E to 9E respectively corresponding to steps 7A to 9A of example 1 were performed to complete the solid electrolytic capacitor shown in FIG. 2D and FIG. 1.

The solid electrolytic capacitor X of the comparative example was fabricated in this manner.

[Evaluation]

A characteristic evaluation was conducted on each of the solid electrolytic capacitors fabricated in examples 1 to 6 and comparative example. In the characteristic evaluation, electrostatic capacitance, equivalent series resistance (ESR), and leakage current were measured. A changing rate of each of these characteristics was calculated from the measurement values taken before and after molding (specifically, measurement value before molding and measurement value after aging) for each characteristic using equations (1) to (3).

changing rate of electrostatic capacitance=(capacitance after aging/capacitance before molding) . . .   equation 1 changing rate of ESR=(ESR after aging/ESR before molding) . . .   equation 2 changing rate of leakage current=(leakage current after aging/leakage current before molding) . . .   equation 3

FIG. 14 shows the evaluation result of the characteristics (capacitance, equivalent series resistance, leakage current) for each of the solid electrolytic capacitors. Each characteristic value is an average for one hundred samples.

The measurement conditions of the capacitance, the ESR, and the leakage current are as described below.

The capacitance (capacitance of the solid electrolytic capacitor at a frequency of 120 Hz) was measured for each solid electrolytic capacitor with an LCR meter.

The ESR (ESR of the solid electrolytic capacitor at a frequency 100 Hz) was measured for each solid electrolytic capacitor with the LCR meter.

The leakage current was determined using a DC current source and a current monitor by measuring the current after 20 seconds elapsed from when a voltage of 2.5 V (corresponding to rated voltage) was applied to each solid electrolytic capacitor.

As shown in FIG. 14, in the comparative example (solid electrolytic capacitor X) of the related art, the capacitance and the ESR are practically the same before and after molding. However, the molding significantly increases the leakage current. In a state before molding as shown in FIG. 2B, the plate-shaped anode terminal 6c and the plate-shaped cathode terminal 7c bonded to the capacitor element 10 are supported by the anode lead 1a. Thus, the increase in leakage current resulting from molding is assumed to be caused by the concentration of stress near the base Z of the anode lead 1a by the pressure of the charged resin during molding (during pressurized injection of molding resin into a mold). The dielectric layer 2 (refer to FIG. 3) near the anode lead 1a thus breaks and cracks, thereby increasing the leakage current of the solid electrolytic capacitor.

Comparatively, in each of examples 1 to 6 (solid electrolytic capacitor A1 to A6), the capacitance and the ESR are practically the same before and after molding. Furthermore, the leakage current is the same before and after molding. In other words, in each example, an increase in leakage current resulting from molding is more suppressed compared to the comparative example of the related art. This is because the capacitor element is bonded to the anode terminal and the cathode terminal in a state in which the terminal are fixed together by the insulative adhesive layer. This prevents the pressure of the injected resin during molding from deforming the anode lead and suppresses the concentration of stress near the base of the anode lead.

Compared to examples 1, 3, 5 (solid electrolytic capacitors A1, A3, A5) in which the superimposed region 22 of the anode terminal 6 and the cathode terminal 7 is arranged on the anode lead 1a, the increase in leakage current is further suppressed in examples 2, 4, 6 (solid electrolytic capacitors A2, A4, A6) in which the superimposed region 22a is arranged on the cathode layer 4. This is because the area of the superimposed region (area of insulative adhesive layer 5a) is wider when arranged on the cathode layer 4. This further firmly fixes the terminals and prevents the pressure of the injected resin during molding from deforming the anode lead 1a.

In examples 3 and 4 (solid electrolytic capacitors A3 and A4) in which the insulative adhesive layer 9 is arranged around the anode lead 1a, the increase in leakage current is further suppressed compared to the other examples. This is because the periphery of the anode lead 1a is reinforced by the insulative adhesive layer 9. This further prevents the pressure of the injected resin during molding from deforming the anode lead 1a.

The solid electrolytic capacitor of the first embodiment (example 1 and example 2) and the method for manufacturing the solid electrolytic capacitor have the advantages described below.

(1) The anode lead 1a of the capacitor element 10 and the cathode layer 4 are respectively bonded to the anode terminal 6 (6a) and the cathode terminal 7 (7a) in a state in which the anode terminal 6 (6a) and the cathode terminal 7 (7a) are fixed together by the insulative adhesive layer 5 (5a). This suppresses the concentration of stress near the base of the anode lead 1a resulting from the pressure of the injected resin during molding and manufactures a solid electrolytic capacitor in which leakage current is prevented from increasing.

(2) The distal end of the anode terminal 6 (6a) and the distal end of the cathode terminal 7 (7a) are superimposed with each other, and the terminals are firmly fixed to each other at the superimposed region 22 (22a) by the insulative adhesive layer 5 (5a). This prevents the pressure of the injected resin during molding from deforming the anode lead 1a and suppresses the concentration of stress near the base of the anode lead 1a. As a result, a solid electrolytic capacitor in which leakage current is further prevented from increasing is manufactured.

(3) When the superimposed region 22a of the anode terminal 6a and the cathode terminal 7a is arranged on the cathode layer 4 of the capacitor element 10 as in example 2, the area of the superimposed region (area of insulative adhesive layer 5a) is easily widened without enlarging the solid electrolytic capacitor compared to when the superimposed region is arranged on the anode lead 1a. The anode terminal 6a and the cathode terminal 7a are thus further firmly fixed together. Thus, advantage (2) is obtained in a further significant manner.

(4) The solid electrolytic capacitor preventing leakage current from increasing may be manufactured through the conventional manufacturing process by simply preparing the lead frame 20 (20a) in which the anode terminal 6 (6a) and the cathode terminal 7 (7a) are fixed together by the insulative adhesive layer 5 (5a). This improves the manufacturing yield and lowers the cost of the solid electrolytic capacitor.

(5) When the superimposed region 22 of the anode terminal 6 and the cathode terminal 7 is arranged on the anode lead 1a of the capacitor element 10 as in example 1, the distal end 1b of the anode lead 1a is preferably extended to a position exceeding the edge of the superimposed region 22 (to a position at which the anode terminal 6 is not covered by the cathode terminal 7). Thus, spot welding may be performed between the anode lead 1a and the anode terminal 6 at the distal end 1b of the anode lead 1a, and the bonding of the anode lead 1a and the anode terminal 6 is ensured.

(6) The capacitor element 10 is mounted on the main surface S1 of the element mounting region 21 (21a) along the bent portion D1 of the cathode terminal 7 (7a). This further increases the bonding area (area of the conductive adhesive layer) between the capacitor element 10 and the cathode terminal 7 (7a). The bonding of the capacitor element 10 and the cathode terminal 7 (7a) is thus ensured.

(7) The lead frame 20 (20a) in which the anode terminal 6 (6a) and the cathode terminal 7 (7a) are fixed together by the insulative adhesive layer 5 (5a) is manufactured in advance. Thus, compared to when fixing the anode terminal 6 (6a) and the cathode terminal 7 (7a) by the insulative adhesive layer 5 (5a) after mounting and bonding the capacitor element 10 to the lead frame, loss of capacitor element parts due to manufacturing errors when fixing the terminals is reduced. This lowers the cost of the solid electrolytic capacitor in which leakage current is prevented from increasing.

(8) The solid electrolytic capacitor of the first embodiment is molded with the anode terminal 6 (6a) and the cathode terminal 7 (7a) fixed together by the insulative adhesive layer 5 (5a). This increase the rigidity of the capacitor, reduces the stress applied by an external force to the anode lead 1a and the anode body 1 (in particular, stress concentrated near the base of the anode lead 1a), and suppresses leakage current.

(9) The distal end of the anode terminal 6 (6a) and the distal end of the cathode terminal 7 (7a) are superimposed with each other, and the superimposed region 22 (22a) is fixed by the insulative adhesive layer 5 (5a). This further firmly fixes the terminals together. Thus, advantage (8) is obtained in a further significant manner.

(10) When the superimposed region 22a of the anode terminal 6a and the cathode terminal 7a is arranged on the cathode layer 4 of the capacitor element 10 as in example 2, the area of the superimposed region (area of the insulative adhesive layer 5a) is easily widened without enlarging the solid electrolytic capacitor compared to when the superimposed region is arranged on the anode lead 1a. This further firmly fixes the anode terminal 6a and the cathode terminal 7a together. Thus, advantage (9) is obtained in a further significant manner.

The solid electrolytic capacitor and the method for manufacturing the same the second embodiment (example 3 and example 4) have the following advantages in addition to advantages (1) to (10).

(11) The periphery of the anode lead 1*a* is reinforced by applying the insulative adhesive layer 9 (9*a*) to the anode lead 1*a* on the anode terminal 6 (6*a*) and in the gap between the lead frame 20 (20*a*) and the capacitor element 10. This prevents the pressure of the injected resin during molding from deforming the anode lead 1*a*, and suppresses concentration of stress near the base of the anode lead 1*a*. As a result, a solid electrolytic capacitor is manufactured in which leakage current is further prevented from increasing compared to the first embodiment.

(12) The solid electrolytic capacitor of the second embodiment is molded with the capacitor element 10 including the anode terminal 6 (6*a*) and the anode lead 1*a*, which are fixed together by the insulative adhesive layer 9 (9*a*). This increases the rigidity of the capacitor, reduces the stress applied by an external force to the anode lead 1*a* and the anode body 1 (in particular, stress concentrated near the base of the anode lead 1*a*) is alleviated, and suppresses leakage current. As a result, a solid electrolytic capacitor is manufactured in which the leakage current is further prevented from increasing compared to the first embodiment.

The solid electrolytic capacitor and the method for manufacturing the solid electrolytic capacitor of the third embodiment (example 5 and example 6) have the advantages described below in addition to advantages (1) to (10).

(13) The cathode terminal 7*b* is bent so as to hold the left and right sides of the capacitor element 10. Compared to example 1, the bonding area between the capacitor element 10 and the cathode terminal 7*b* (area of the conductive adhesive layer) is further increased. Thus, advantages (6) and (10) are obtained in a further significant manner.

(14) In example 6, the anode terminal 6*b* and the cathode terminal 7*b* are both bent so as to hold the left and right sides of the capacitor element 10. Thus, compared to example 2, the area of the superimposed region (area of the insulative adhesive layer 5*a*) is further widened. This obtains advantages (3) and (10) in a further significant manner.

It should be apparent to those skilled in the art that the present invention may be embodied in many other specific forms without departing from the spirit or scope of the invention. Particularly, it should be understood that the present invention may be embodied in the following forms.

In the above examples, the anode terminal and the cathode terminal are fixed together by the insulative adhesive layer, which is arranged over the entire superimposed region. However, the present invention is not limited in such a manner. For instance, the insulative adhesive layer may be arranged in only part of the superimposed region or at a number of locations in the superimposed region. Alternatively, the insulative adhesive layer may be arranged so as to extend out of the superimposed region.

In the above examples, the insulative adhesive layer is arranged on the superimposed region at which the distal end of the anode terminal and the distal end of the cathode terminal are overlapped. However, the present invention is not limited in such a manner. For instance, the distal end of the anode terminal and the distal end of the cathode terminal do not have to be overlapped. Alternatively, the insulative adhesive layer may be arranged so as to bridge over the distal ends of the terminals. This would also integrally connect the two terminals.

In the above examples, a capacitor element uses niobium metal for the anode body. However, the present invention is not limited in such a manner. The capacitor element may use valve metals such as tantalum, aluminum, and titanium, or an alloy of such metals.

In the above examples, a capacitor element uses polypyrrole for a conductive polymer layer that serves as the electrolyte layer. However, the present invention is not limited in such a manner. The capacitor element may use a conductive inorganic material such as manganese dioxide or a conductive organic material such as TCNQ complex salt.

The present examples and embodiments are to be considered as illustrative and not restrictive, and the invention is not to be limited to the details given herein, but may be modified within the scope and equivalence of the appended claims.

What is claimed is:

1. A solid electrolytic capacitor comprising:
    a capacitor element including an anode body, which has an anode lead, and a cathode layer; and
    a lead terminal including an anode terminal, which is connected to the anode lead, and a cathode terminal, which is connected to the cathode layer,
    wherein the lead terminal further includes:
    a bent portion that brings a distal end side of the anode terminal and a distal end side of the cathode terminal closer together; and
    a first insulative member connecting the anode terminal and the cathode terminal at a superimposed region at which the distal end side of the anode terminal and the distal end side of the cathode terminal are superimposed.

2. The solid electrolytic capacitor according to claim 1, wherein the superimposed region is arranged on the cathode layer.

3. The solid electrolytic capacitor according to claim 1, further comprising: a second insulative member which at least partially fixes the anode terminal and the capacitor element.

4. The solid electrolytic capacitor according to claim 3, wherein the second insulative member at least partially fixes near a base of the anode lead projecting out of the capacitor element.

* * * * *